United States Patent
Rossen

(10) Patent No.: US 12,328,230 B2
(45) Date of Patent: Jun. 10, 2025

(54) AUTOMATED NETWORK CONFIGURATION USING CONFIGURATION TEMPLATES BASED ON DEVICE TRAFFIC ATTRIBUTES

(71) Applicant: MICRO FOCUS LLC, Santa Clara, CA (US)

(72) Inventor: Lars Rossen, Ballerup (DK)

(73) Assignee: Micro Focus LLC, Santa Clara, CA (US)

( * ) Notice: Subject to any disclaimer, the term of this patent is extended or adjusted under 35 U.S.C. 154(b) by 105 days.

(21) Appl. No.: 18/142,994

(22) Filed: May 3, 2023

(65) Prior Publication Data
US 2024/0372782 A1    Nov. 7, 2024

(51) Int. Cl.
  *H04L 41/0895* (2022.01)
  *H04L 12/46* (2006.01)
  *H04L 41/084* (2022.01)
  *H04L 9/40* (2022.01)

(52) U.S. Cl.
  CPC ...... *H04L 41/0895* (2022.05); *H04L 12/4641* (2013.01); *H04L 41/0843* (2013.01); *H04L 63/101* (2013.01)

(58) Field of Classification Search
  CPC . H04L 41/08; H04L 41/0895; H04L 12/4641; H04L 41/0843; H04L 41/084; H04L 41/0886; H04L 41/0893; H04L 41/0894; H04L 41/0803; H04L 63/101
  See application file for complete search history.

(56) References Cited

U.S. PATENT DOCUMENTS

| | | | |
|---|---|---|---|
| 10,097,517 B2 | 10/2018 | McElwee | |
| 10,965,759 B2 | 3/2021 | Anumala | |
| 2014/0068030 A1* | 3/2014 | Chambers | H04L 41/0894 709/220 |
| 2019/0238539 A1* | 8/2019 | Arora | H04L 63/162 |
| 2020/0120004 A1* | 4/2020 | Kohout | H04L 47/2433 |
| 2021/0352013 A1* | 11/2021 | Devaraj | H04L 45/74 |
| 2021/0392150 A1* | 12/2021 | Srinivas | G06N 5/047 |
| 2021/0392171 A1 | 12/2021 | Srinivas | |
| 2022/0108806 A1* | 4/2022 | Kommalapati | H04L 12/1859 |

FOREIGN PATENT DOCUMENTS

EP    3382942 B1 *  8/2020  ......... H04L 12/4641

* cited by examiner

*Primary Examiner* — Johnny B Aguiar
(74) *Attorney, Agent, or Firm* — Sheridan Ross P.C.

(57) ABSTRACT

Devices with low or no security are often added to networks. These devices have the ability to utilize the network and, accordingly, may pose a security risk. Systems and methods herein enable a device to be added to a network and, if the resulting new traffic matches a template, the device is established on an automatically created virtual local area network (VLAN) used solely for the new device. A router is automatically configured to allow traffic that matches the type of device that was newly added, but if other traffic is detected, the device may be treated as a threat and managed accordingly.

20 Claims, 3 Drawing Sheets

AUTOMATED NETWORK CONFIGURATION USING CONFIGURATION TEMPLATES BASED ON DEVICE TRAFFIC ATTRIBUTES

FIELD OF THE DISCLOSURE

The invention relates generally to systems and methods for automatically configuring a network for a newly added device.

BACKGROUND

Securing networked devices, such as Internet of Things (IoT) devices, in particular devices that have not been designed to be secure, requires creation of a virtual network, such as a virtual local area network (VLAN), dedicated to each device. Creating and managing VLANs are complicated, and manual configuration is often skipped due to the overhead. Alternatively, IoT devices may be secured by using a more coarse-grained perimeter defense; however, such strategies make it impossible to implement a "Zero Trust" architecture, and a single bad IoT device can compromise the entire organization's network.

SUMMARY

Historically, configuring a network to accommodate IoT devices requires manual configuration. Manual configuration of a network is costly, requires high skill levels, is error prone, and is difficult to maintain. Alternatively, a more coarse-grained security perimeter may be established that monitors the network for malicious behavior. However, such an approach does not avert threats but may detect a threat after the fact.

These and other needs are addressed by the various embodiments and configurations of the present invention. The present invention can provide a number of advantages depending on the particular configuration. These and other advantages will be apparent from the disclosure of the invention(s) contained herein.

Embodiments herein are generally directed to automatically discovering new devices that have been added to a network. Devices are discovered through traffic analysis and, once discovered, classified. Based on the classification, a VLAN is automatically established and configured for use by the new device. As a further option, a VLAN may be augmented with a zero-trust access policy.

In one embodiment, a traffic classifier, a VLAN configurator, and optionally, an IoT proxy are provided. Network traffic is monitored to a newly added device and configurations are provided to the router connected to the IoT local area network (LAN) and the corporate (or other private) network and/or internet. The router may then route all traffic addressed to the new device to the IoT proxy and, in turn, route the traffic to the new device. Additionally or alternatively, the combination may configure the switch that connects the dedicated LAN connection of the IoT device to the upstream connection to the router.

When a new IoT device is connected to a switch, a router providing network connectivity to the switch will see the new traffic from a new ethernet endpoint (i.e., the new IoT device). This new traffic is monitored by the traffic classifier. Based on templates of devices, the classifier will determine the type of device and provide the type to the VLAN configurator. The VLAN configurator selects an action based on a match of the device type to a device type template. The actions include at least one of configure a new VLAN on the switch on the dedicated port the new device was detected on and/or configure a firewall rule in the router to only allow traffic to and from the IoT device according to the template for the type of device (e.g., blocking traffic that does not correspond to a type of traffic identified by the template). Optionally, the router is configured to route all traffic to an IoT proxy component instead of directly to the corporate network and wherein the IoT proxy component is configured to allow the IoT Device to only access a set of well-defined identities (e.g., a whitelist). Additionally or alternatively, inbound traffic may be controlled via a zero-trust access (e.g., the device must be successfully authenticated) otherwise the traffic is blocked.

As a further embodiment, network traffic may be blocked unless approved. Approval may be further embodied as one or more of the following: outbound, wherein traffic is permitted to previously approved destinations, ports, and/or protocols; inbound: wherein traffic is permitted to previously approved sources, ports, and/or protocols (often referred to as a "pinhole"); or identity-based access associated with inbound communications. Identity based access securely validates the inbound traffic at the IoT Proxy and access rights are looked up either in an identity authorization whitelist that is maintained locally and/or remotely, such as an identity access service).

As a benefit of the embodiments provided herein, networks are secured while enabling non-secure devices. Complicated manual VLAN configuration is automated, and dedicated zero-trust access restriction based on identity can be implemented for IoT devices that do not provide any (or sufficient) security out of the box.

In one example, a factory adds a computer-controlled piece of equipment, commonly called Industrial Internet of Things (IIoT), and attaches to the factory's network. Security provided by the device may be insufficient and provide attack surfaces that may allow an unauthorized party to affect the equipment, obtain information, or access other devices on the network. A vulnerability on one machine may provide an opportunity to cascade hacks to other machines or other networked devices.

Historically, some organizations would segregate the factory network into one or more VLANs, often one per machine. As the number of machines increases so too does the difficulty in managing the systems. A few minutes spent on each VLAN can become days of work for a large facility. Embodiments herein automate the addition of network devices to the network that maintains security, such as to establish a single VLAN for each machine with well-defined connectivity upstream.

In offices or similar settings that continually add devices, embodiments herein enable devices to be segregated as secure or non-secure automatically. Non-secure devices are added to a VLAN and secure devices are managed through other means, omitting the need to unnecessarily add secure devices to a VLAN. Similarly, home networks often have devices that have poor security. Automatically detecting the device and adding it to a VLAN protects the remaining portion of the home network.

In another embodiment, the traffic classifier classifies a device based on traffic type comprising a connection destination (e.g., an Internet protocol (IP) address and/or port number). Many devices "dial home" upon power-on or first startup, such as to register or check for new firmware updates. A currently unknown device that "dials home" to a known destination is then identified. If the IP address is known, a domain name system (DNS) lookup may determine the corresponding enterprise and one of a set of devices. In another embodiment, ethernet numbers (e.g., by inspecting the address resolution protocol (ARP) requests) are utilized for classification, which may indicate a type of network card and, therefrom, the type of device. Once the traffic classifier detects a new device, a scan of open ports may reveal a new open port, which may indicate a device's manufacturer or type of equipment. In another embodiment, classification may occur via dynamic Host Configuration Protocol (DHCP) lookup, which can include the name of the machine and an order of connections (DHCP, DNS, Network Time Protocol (NTP), and other calls at startup), and subsequently be associated with a particular type of device (or eliminate devices from consideration if not associated with the order).

Exemplary embodiments are directed to:

A system for automatically configuring a network, comprising: a traffic classifier having access to a number of traffic templates, each traffic template associating a device type with corresponding traffic attributes; a virtual local area network (VLAN) configurator having access to a number of configuration templates, each configuration template associating the device type to corresponding network permissions; wherein the network exchanges network traffic and wherein the traffic classifier receives a portion of the network traffic originating from a new source to the traffic classifier; wherein the traffic classifier selects a matching traffic template from the number of traffic templates having traffic attributes that best match attributes of the portion of the network traffic originating from the new source and identifying the new source as a new device of the device type of the matching traffic template; wherein the traffic classifier provides the device type of the new device to the VLAN configurator and, therefrom, the VLAN configurator selects a matching configuration template from the number of configuration templates associated with the device type of the new device; and wherein the VLAN configurator provides switch settings of the matching configuration template to a switch to cause the switch to create a new VLAN thereon comprising the new device.

A method for automatically configuring a network, comprising: accessing a number of traffic templates, each traffic template of the number of traffic templates associating a device type with corresponding traffic attributes; accessing a number of configuration templates, each configuration template of the number of configuration templates associating the device type to network permissions; monitoring network traffic on a private network; and upon determining that the network traffic comprises a new source of network traffic, further performing: selecting a matching traffic template from the number of traffic templates having traffic attributes that best match attributes of a portion of the network traffic originating from the new source and identifying the new source as a new device of the device type of the matching traffic template; selecting a matching configuration template from the number of configuration templates associated with the device type of the new device; and permitting network traffic from the new device that matches the configuration template.

A network component for automatically configuring a network, comprising: a traffic classifier module having access to a number of traffic templates, each traffic template of the number of traffic templates associating a device type with corresponding traffic attributes; a virtual local area network (VLAN) configurator module having access to a number of configuration templates, each configuration template of the number of configuration templates associating the device type to corresponding network permissions; wherein the network exchanges network traffic and the traffic classifier module receives a portion of the network traffic originating from a new source to the traffic classifier; wherein the traffic classifier module selects a matching traffic template from the number of traffic templates having traffic attributes that best match attributes of the portion of the network traffic originating from the new source and identifying the new source as a new device of the device type of the matching traffic template; wherein the traffic classifier module provides the device type of the new device to the VLAN configurator module and, therefrom, the VLAN configurator module selects a matching configuration template from the number of configuration templates associated with the device type of the new device; and wherein the VLAN configurator module provides switch settings of the matching configuration template to a switch module to cause the switch module to create a new VLAN thereon comprising the new device.

Any of the above aspects:

Wherein the VLAN configurator further provides router settings of the matching configuration template to the router to cause the router to configure a firewall rule to permit traffic with the new device that has traffic attributes that match the traffic template and deny all other traffic.

Wherein the traffic attributes comprise one or more of a destination internet protocol (IP) address and port, hypertext transfer protocol (HTTP) header information, a directory name service (DNS) request, an IP address corresponding to DNS requests, and an order of connections.

Wherein the traffic attributes comprise IP addresses of known destinations corresponding to the device type.

Further comprising: an Internet of Things (IoT) proxy; and wherein the VLAN configurator provides router settings to cause the router to route all traffic destined to the new device to the IoT proxy; and wherein the IoT proxy allows traffic only with previously whitelisted destinations.

Wherein the IoT proxy whitelists destinations associated with traffic attributes corresponding to the device type.

Wherein the IoT proxy receives HTTP data as a portion of the network traffic to or from the new device, and encrypts the HTTP data into hypertext transfer protocol secure (HTTPS) data.

Further comprising denying network traffic from the new device that does not match the configuration template.

Further comprising providing a firewall rule to a firewall to permit traffic with the new device that has traffic attributes that match the traffic template and deny all other traffic.

Wherein the traffic attributes comprise one or more of a destination internet protocol (IP) address and port, hypertext transfer protocol (HTTP) header information, a directory name service (DNS) request, an IP address corresponding to DNS requests, and an order of connections.

Wherein the traffic attributes comprise IP addresses of known destinations corresponding to the device type.

Further comprising: routing all network traffic destined to the new device to a proxy; and wherein the proxy allows traffic only with previously whitelisted destinations.

Wherein the proxy whitelists destinations associated with traffic attributes corresponding to the device type.

Wherein the proxy receives HTTP data as a portion of the traffic to or from the new device, and encrypts the HTTP data into hypertext transfer protocol secure (HTTPS) data.

Wherein the VLAN configurator module further provides router settings of the matching configuration template to the router module to cause the router module to configure a firewall rule to permit traffic with the new device that has traffic attributes that match the traffic template and deny all other traffic.

Further comprising: an Internet of Things (IoT) proxy module; and wherein the VLAN configurator module provides router settings to cause the router module to route all traffic destined to the new device to the IoT proxy module; and wherein the IoT proxy module allows traffic only with previously whitelisted destinations.

Wherein the IoT proxy module whitelists destinations associated with traffic attributes corresponding to the device type.

Wherein the IoT proxy module receives HTTP data as a portion of the network traffic to or from the new device, and encrypts the HTTP data into hypertext transfer protocol secure (HTTPS) data.

A system on a chip (SoC) including any one or more of the above aspects or aspects of the embodiments described herein.

One or more means for performing any one or more of the above aspects or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, radio frequency (RF), etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
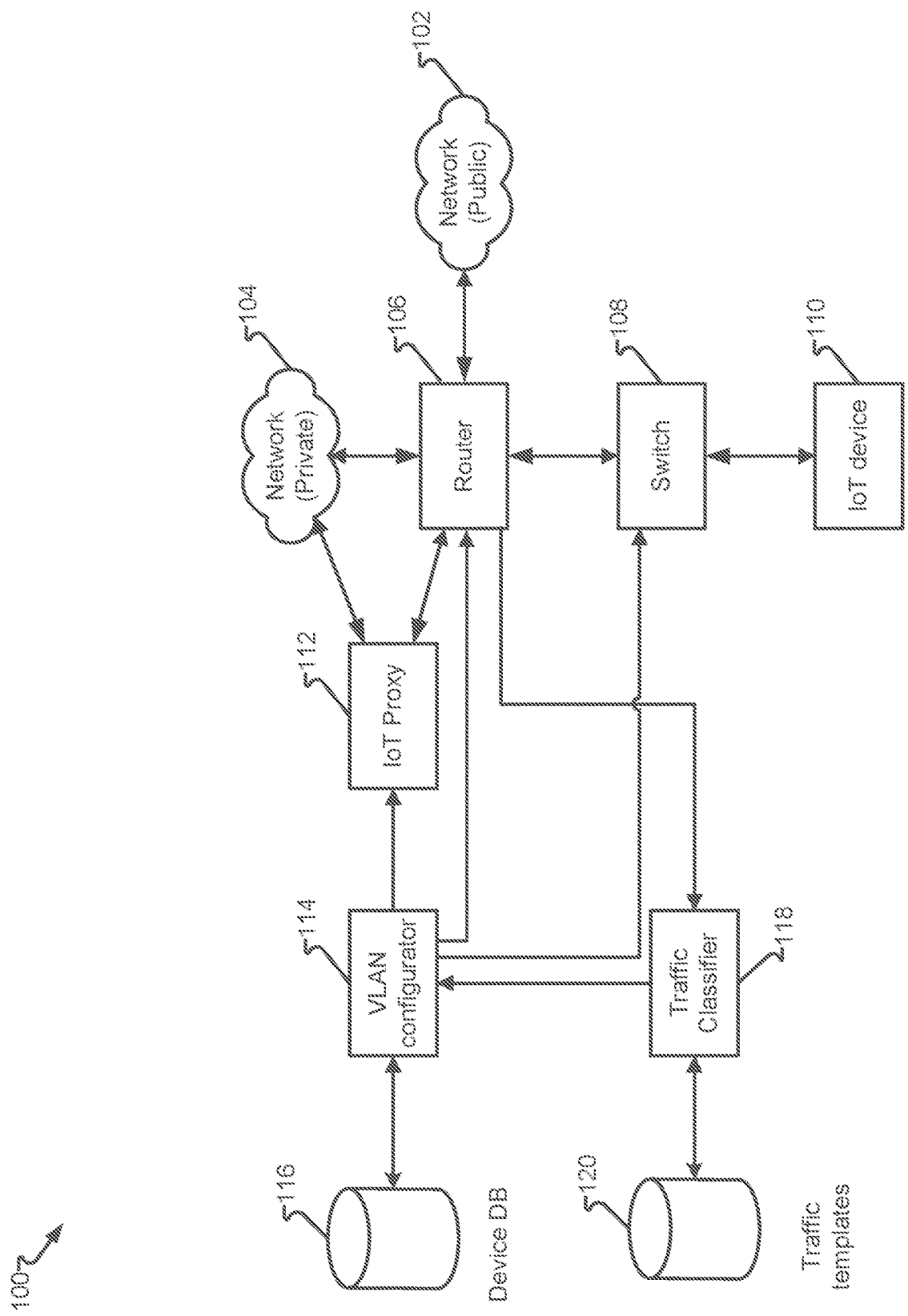
FIG. 1 depicts a system in accordance with embodiments of the present disclosure.

FIG. 1 depicts system 100 in accordance with embodiments of the present disclosure. In one embodiment, private network 104 (and components thereon) communicate with devices via public network 102 (e.g., the Internet). It should be appreciated that the components utilized to perform common services are omitted for clarity, such as to the hardware required to connect the public network 102 with private network 104. At a first time, components of system 100 include router 106, switch 108, IoT proxy 112, VLAN configurator 114, device database 116, traffic classifier 118, and traffic templates database 120. At a second time, after the first time, system 100 includes a device added to private network 104, such as IoT device 110. IoT device 110 may be any device comprising a network interface to communicate with devices on a network (e.g., private network 104 and/or public network 102). It should also be appreciated that system 100 illustrates components and communication flows and one network topology. Other topologies may be utilized without departing from the scope of the embodiments. For example, while private network 104 is illustrated as a discrete entity, for example device database 116, VLAN configurator 114, traffic templates database 120, and traffic classifier 118 are illustrated without a connection to private network 104, that in other topologies, one or more of the foregoing devices may be a node on private network 104. It should also be appreciated that, in other embodiments, two or more of the components of system 100, other than IoT device 110, may be combined into fewer or a single module. In another embodiment, one or more components of system 100 may be embodied as two or more components.

When IoT device 110 is connected to switch 108, which is in communication with router 106, router 106 sees new traffic from a new ethernet endpoint (e.g., from IoT device 110). Router 106 provides traffic and/or traffic attributes of the traffic to traffic classifier 118. The connection by IoT device 110 may be determined in one or more ways, including but not limited to, monitoring router logs for changes, polling of the router for information, and/or reconfiguring the router to track more data on a connection until a classification has been done.

Traffic classifier 118, with access to traffic templates from traffic templates database 120, determines a best match to a template in order to identify IoT device 110. To "identify" is variously embodied and may include one or more of identification of a type of device (e.g., printer, camera, manufacturing machine, etc.), manufacturer, seller, model number, etc. Identification may be definitive (e.g., a specific device from a specific manufacturer), partial (e.g., a camera from an unknown manufacturer, an unknown product from a known manufacturer, etc.), or exclusionary (e.g., not a printer, not a camera, etc.). Furthermore, a match to a particular traffic template in traffic templates database 120 may need to be absolute (e.g., no traffic observed that is outside the particular traffic template) or have a previously determined acceptable variation of traffic. In another embodiment, IoT device 110 may be entirely unknown beyond having an ability to communicate via switch 108 when no existing template matches the type of traffic observed by router 106. Traffic classifier 118 may create a new record in traffic templates database 120 for observed but currently unclassified traffic, which may be updated with descriptors of the unknown device once they become known.

From the classification, traffic classifier 118 identifies IoT device 110 by classification and provides device classification to VLAN configurator 114. Classification is variously embodied and may be determined from one or more traffic attributes such as the destination internet protocol (IP) number and port, inspection of HTTP/HTTPS header information, DNS requests (e.g., an IP address of its "call home" server), etc., in order to "fingerprint" the traffic from IoT device 110 and, as a result, classify IoT device 110. For example, if a port is commonly used by an IoT camera manufacturer, then opening of such a port indicates that IoT device 110 is a networked camera.

Upon receiving the classification, VLAN configurator 114 accesses a corresponding configuration template from device database 116. In one embodiment, VLAN configurator 114, in accordance with the configuration template, provides configuration settings to switch 108 to create a new VLAN on switch 108 and dedicates the port on which IoT device 110 was detected to be using. In another embodiment, VLAN configurator 114 provides configuration to router 106 with a firewall rule for router 106 to only allow traffic to and from IoT device 110 that is of the type matching the template and block all other traffic. For example, if IoT device 110 is determined to be a camera, then only traffic having traffic attributes associated with cameras and their operations is permitted. All other traffic, such as accessing a controller of a manufacturing machine, would be blocked and/or IoT device 110 identified as acting anomalously, mischaracterized, malicious, or an "unknown" or potential threat and mitigated accordingly.

Optionally, IoT proxy 112 can be configured by VLAN configurator 114 to only allow access for well-defined identities, in which case router 106 is configured to route all traffic to IoT proxy 112 instead of directly to private network 104. As a result, IoT proxy 112 automatically whitelists certain connections identified by VLAN configurator 114. Additionally or alternatively, any traffic not whitelisted is blocked (blacklisted by default). Traffic from blacklisted devices can be identified and removed, if malicious. If a blacklisted device is determined to be not malicious, re-identified (adding a new device template), reconfiguring the device, or manually whitelisted may be performed. As a further option, IoT device 110, when identified as having poor security, may add HTTPS encryption and identity-based logins before allowing access.

How IoT device 110 is classified is variously embodied. Embodiments may include any one or more of: "secured" (e.g., IoT device 110 provides its own security) or, when security is absent, "unsecured"; classified based on an IP address utilized by IoT device 110 (e.g., connecting to a known IP address of a camera manufacturer upon device startup); DNS lookup (identify the IP address of "call home" server), newly opened ports used for connecting (e.g., a dedicated port above 1024 known to be used for a particular manufacturer); extracting vendor, device, and version information from HTTP headers; a protocols utilized; and/or sequences of connections (e.g., an NTP call followed by two DNS calls, followed by one HTTP and two HTTP calls, etc.).

In another embodiment, templates may be built from a pre-configured set of rules to allow certain traffic but not allow other traffic. Templates comprise a set of regular search expressions that would be run on the log data collected from the router. Additionally or alternatively, the template may comprise instructions to further interrogate router 106 for more information (e.g., runbook language).

Figure 2:
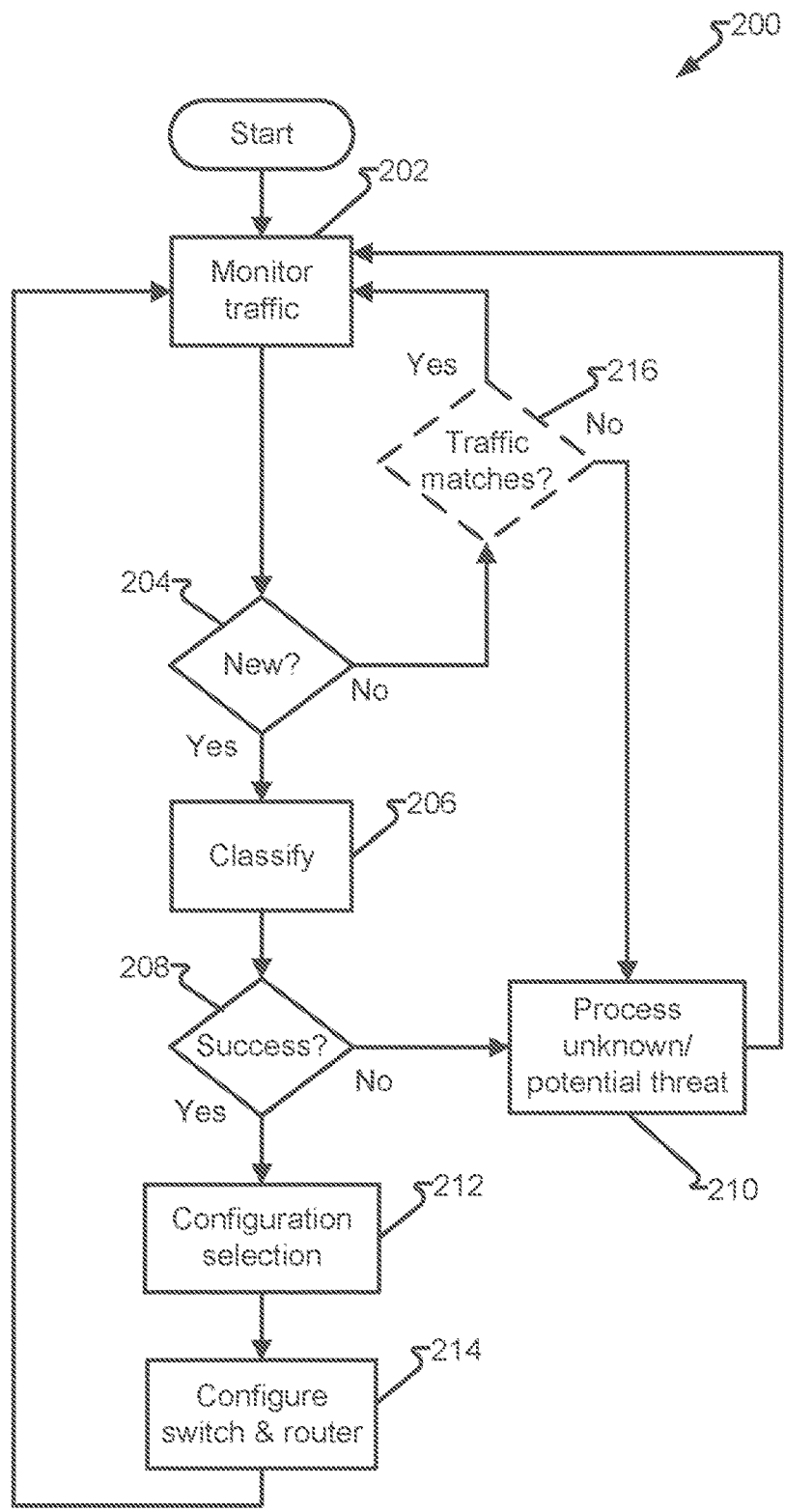
FIG. 2 depicts a method in accordance with embodiments of the present disclosure.

FIG. 2 depicts process 200 in accordance with embodiments of the present disclosure. In one embodiment, process 200 is embodied as machine-readable instructions maintained in a non-transitory memory that when read by a machine, such as processors of one or more of router 106, switch 108, IoT device 110, IoT proxy 112, VLAN configurator 114, and/or traffic classifier 118, cause the machine to execute the instructions and thereby execute process 200.

In one embodiment, process 200 begins (or continues) and step 202 monitors network traffic, such as by IoT device 110 monitoring traffic on private network 104. Test 204 determines if the network traffic comprises traffic from a new device and, if true, classifies the network traffic in step 206. Test 208 determines if the classification is successful and, if true, step 212 selects a particular configuration based on the classification of the new device (step 206). Step 214 then configures a router and switch in accordance with the particular configuration.

If test 208 is determined in the negative, and the new network traffic, and therefore the new device, cannot be successfully classified, processing continues to step 210 to proceed with processing the device as an unknown and/or potential threat, such as to isolate the new device from the network and/or signal personnel to remove the device. If the device is erroneously indicated as a threat, characteristics of the new device and its traffic may be added to traffic templates database 120 and/or device database 116.

Optionally, upon test 204 being determined in the negative, processing may continue to test 216 to determine if the traffic from the (previously known device) matches that of a template (such as a template from device database 116). If test 216 is determined in the affirmative, processing continues to step 202 wherein network traffic is continued to be monitored. However, if test 216 is determined in the negative then a previously known device may be a threat and processing continues to step 210 to isolate, remove, and/or manually correct the traffic template for the previously known device.

Figure 3:
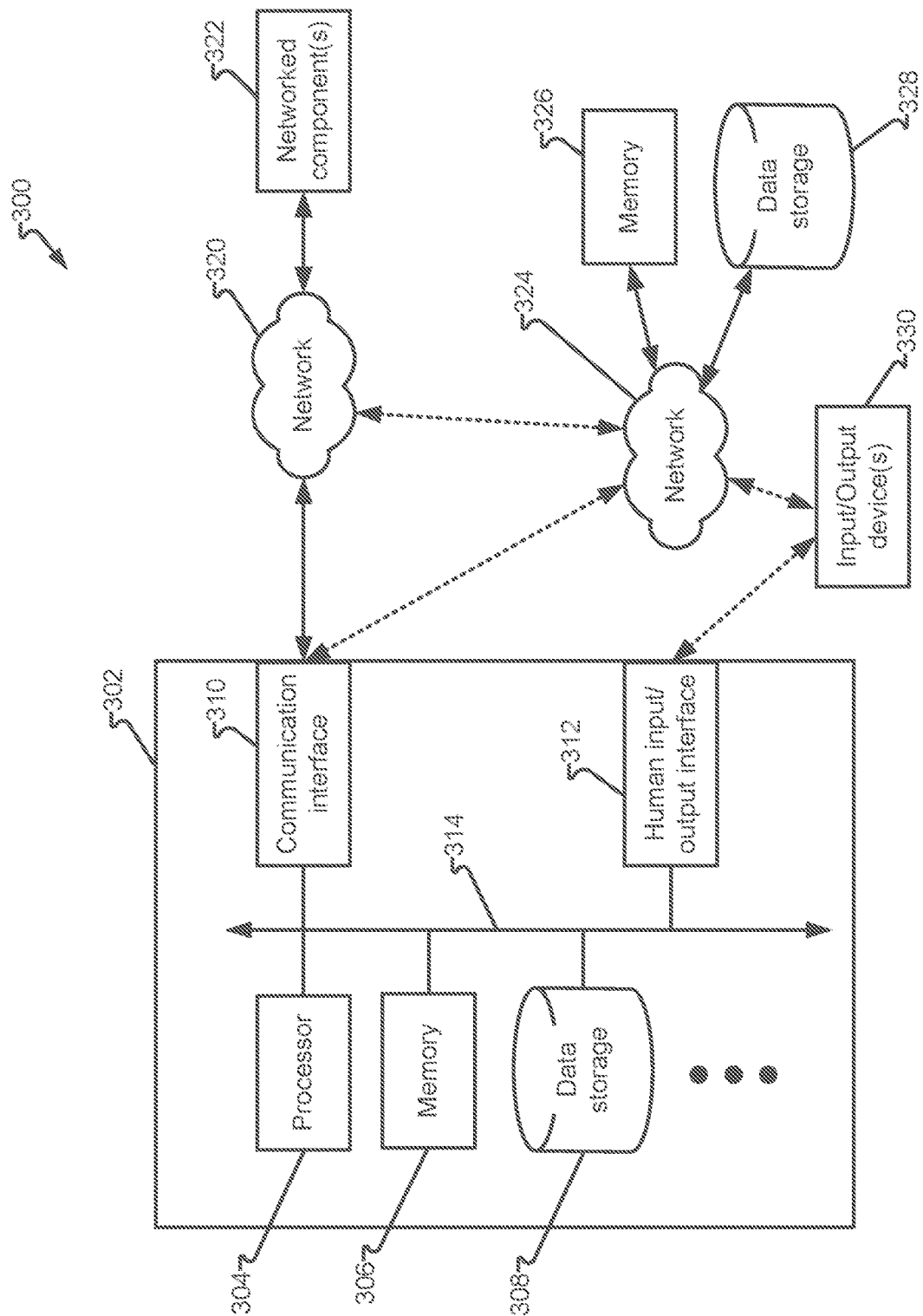
FIG. 3 depicts a system in accordance with embodiments of the present disclosure.

FIG. 3 depicts device 302 in system 300 in accordance with embodiments of the present disclosure. In one embodiment, one or more of VLAN configurator 114, IoT proxy 112, router 106, switch 108, traffic classifier 118, and/or the combination when any two or more of the foregoing are combined, and/or IoT device 110 may be embodied, in whole or in part, as device 302 comprising various components and connections to other components and/or systems. The components are variously embodied and may comprise processor 304. The term "processor," as used herein, refers exclusively to electronic hardware components comprising electrical circuitry with connections (e.g., pin-outs) to convey encoded electrical signals to and from the electrical circuitry. Processor 304 may comprise programmable logic functionality, such as determined, at least in part, from accessing machine-readable instructions maintained in a non-transitory data storage, which may be embodied as circuitry, on-chip read-only memory, computer memory 306, data storage 308, etc., that cause the processor 304 to perform the steps of the instructions. Processor 304 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 314, executes instructions, and outputs data, again such as via bus 314. In other embodiments, processor 304 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 304 is a non-transitory computing device (e.g., electronic machine comprising circuitry and connections to communicate with other components and devices). Processor 304 may operate a virtual processor, such as to process machine instructions not native to the processor (e.g., translate the Virtual Address extension (VAX) operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 304). Processor 304 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 304, device 302 may utilize computer memory 306 and/or data storage 308 for the storage of accessible data, such as instructions, values, etc. Communication interface 310 facilitates communication with components, such as processor 304 via bus 314 with components not accessible via bus 314. Communication interface 310 may be embodied as a network port, card, cable, or other configured hardware device. Additionally or alternatively, human input/output interface 312 connects to one or more interface components to receive and/or present information (e.g., instructions, data, values, etc.) to and/or from a human and/or electronic device. Examples of input/output devices 330 that may be connected to input/output interface include, but are not limited to, keyboard, mouse, trackball, printers, displays, sensor, switch, relay, speaker, microphone, still and/or video camera, etc. In another embodiment, communication interface 310 may comprise, or be comprised by, human input/output interface 312. Communication interface 310 may be configured to communicate directly with a networked component or configured to utilize one or more networks, such as network 320 and/or network 324.

Public network 102 may be embodied, in whole or in part, as network 320. Network 320 may be a wired network (e.g., Ethernet), wireless (e.g., WiFi, Bluetooth, cellular, etc.) network, or combination thereof and enable device 302 to communicate with networked component(s) 322. In other embodiments, network 320 may be embodied, in whole or in part, as a telephony network (e.g., public switched telephone network (PSTN), private branch exchange (PBX), cellular telephony network, etc.).

In another embodiment, public network 102 may be embodied as network 324 may represent a second network, which may facilitate communication with components utilized by device 302. For example, network 324 may be an internal network to a business entity or other organization, whereby components are trusted (or at least more so) than networked components 322, which may be connected to network 320 comprising a public network (e.g., Internet) that may not be as trusted.

Components attached to network 324 may include computer memory 326, data storage 328, input/output device(s) 330, and/or other components that may be accessible to processor 304. For example, computer memory 326 and/or data storage 328 may supplement or supplant computer memory 306 and/or data storage 308 entirely or for a particular task or purpose. As another example, computer memory 326 and/or data storage 328 may be an external data repository (e.g., server farm, array, "cloud," etc.) and enable device 302, and/or other devices, to access data thereon. Similarly, input/output device(s) 330 may be accessed by processor 304 via human input/output interface 312 and/or via communication interface 310 either directly, via network 324, via network 320 alone (not shown), or via networks 324 and 320. Each of computer memory 306, data storage 308, computer memory 326, data storage 328 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 330 may be a router, a switch, a port, or other communication component such that a particular output of processor 304 enables (or disables) input/output device 330, which may be associated with network 320 and/or network 324, to allow (or disallow) communications between two or more nodes on network 320 and/or network 324. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., central processing unit (CPU), graphics processing unit (GPU)) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, erasable programmable read-only memory (EPROMs), EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G Long Term Evolution (LTE) Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core i5-4670K and i7-4770K 22 nm Haswell, Intel® Core® i5-3570K 22 nm Ivy Bridge, the Advanced Micro Devices (AMD®) FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® Open Multimedia Applications Platform (OMAP)™ automotive-grade mobile microprocessors, Advanced RISC Machine (ARM®) Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an application-specific integrated circuit (ASIC) or other integrated circuit, a digital signal microprocessor, a hard-wired electronic or logic circuit such as discrete element circuit, a programmable logic device or gate array such as a programmable logic device (PLD), programmable logic array (PLA), FPGA, Programmable Array Logic (PAL), special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or very large scale integration (VLSI) design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for automatically configuring a network, comprising:
   a traffic classifier having access to a number of traffic templates, each traffic template associating a device type with corresponding traffic attributes;
   a virtual local area network (VLAN) configurator having access to a number of configuration templates, each configuration template associating the device type to corresponding network permissions;
   wherein the network exchanges network traffic and the traffic classifier receives a portion of the network traffic originating from a new source to the traffic classifier;

wherein the traffic classifier selects a matching traffic template from the number of traffic templates having traffic attributes that best match attributes of the portion of the network traffic originating from the new source and identifying the new source as a new device of the device type of the matching traffic template;

wherein the traffic classifier provides the device type of the new device to the VLAN configurator and, therefrom, the VLAN configurator selects a matching configuration template from the number of configuration templates associated with the device type of the new device; and wherein the VLAN configurator provides switch settings of the matching configuration template to a switch to cause the switch to create a new VLAN thereon comprising the new device.

2. The system of claim 1, wherein the VLAN configurator further provides router settings of the matching configuration template to a router to cause the router to configure a firewall rule to permit traffic with the new device that has traffic attributes that match the matching traffic template and deny all other traffic.

3. The system of claim 1, wherein the traffic attributes comprise one or more of a destination internet protocol (IP) address and port, hypertext transfer protocol (HTTP) header information, a directory name service (DNS) request, an IP address corresponding to DNS requests, and an order of connections.

4. The system of claim 1, wherein the traffic attributes comprise internet protocol (IP) addresses of known destinations corresponding to the device type.

5. The system of claim 1, further comprising:
an Internet of Things (IoT) proxy; and
wherein the VLAN configurator provides router settings to cause a router to route all traffic destined to the new device to the IoT proxy; and
wherein the IoT proxy allows network traffic only with previously whitelisted destinations.

6. The system of claim 5, wherein the IoT proxy whitelists destinations associated with traffic attributes corresponding to the device type.

7. The system of claim 5, wherein the IoT proxy receives hypertext transfer protocol (HTTP) data as a portion of the network traffic to or from the new device, and encrypts the HTTP data into hypertext transfer protocol secure (HTTPS) data.

8. A method for automatically configuring a network, comprising:
accessing a number of traffic templates, each traffic template of the number of traffic templates associating a device type with corresponding traffic attributes;
accessing a number of configuration templates, each configuration template of the number of configuration templates associating the device type to network permissions;
monitoring network traffic on a private network; and
upon determining that the network traffic comprises a new source of network traffic, further performing:
selecting a matching traffic template from the number of traffic templates having traffic attributes that best match attributes of a portion of the network traffic originating from the new source and identifying the new source as a new device of the device type of the matching traffic template;
selecting, by a virtual local area network (VLAN) configurator, a matching configuration template from the number of configuration templates associated with the device type of the new device;
providing, by the VLAN configurator, switch settings of the matching configuration template to a switch to cause the switch to create a new VLAN thereon comprising the new device; and
permitting, by the switch, network traffic from the new device that matches the matching configuration template.

9. The method of claim 8, further comprising denying network traffic from the new device that does not match the matching configuration template.

10. The method of claim 8, further comprising providing a firewall rule to a firewall to permit traffic with the new device that has traffic attributes that match the matching traffic template and deny all other traffic.

11. The method of claim 8, wherein the traffic attributes comprise one or more of a destination internet protocol (IP) address and port, hypertext transfer protocol (HTTP) header information, a directory name service (DNS) request, an IP address corresponding to DNS requests, and an order of connections.

12. The method of claim 8, wherein the traffic attributes comprise internet protocol (IP) addresses of known destinations corresponding to the device type.

13. The method of claim 8, further comprising:
routing all network traffic destined to the new device to a proxy; and
wherein the proxy allows network traffic only with previously whitelisted destinations.

14. The method of claim 13, wherein the proxy whitelists destinations associated with traffic attributes corresponding to the device type.

15. The method of claim 13, wherein the proxy receives hypertext transfer protocol (HTTP) data as a portion of the network traffic to or from the new device, and encrypts the HTTP data into hypertext transfer protocol secure (HTTPS) data.

16. A network component for automatically configuring a network, comprising:
a traffic classifier module having access to a number of traffic templates, each traffic template of the number of traffic templates associating a device type with corresponding traffic attributes;
a virtual local area network (VLAN) configurator module having access to a number of configuration templates, each configuration template of the number of configuration templates associating the device type to corresponding network permissions;
wherein the network exchanges network traffic and wherein the traffic classifier module receives a portion of the network traffic originating from a new source to the traffic classifier module;
wherein the traffic classifier module selects a matching traffic template from the number of traffic templates having traffic attributes that best match attributes of the portion of the network traffic originating from the new source and identifying the new source as a new device of the device type of the matching traffic template;
wherein the traffic classifier module provides the device type of the new device to the VLAN configurator module and, therefrom, the VLAN configurator module selects a matching configuration template from the number of configuration templates associated with the device type of the new device; and
wherein the VLAN configurator module provides switch settings of the matching configuration template to a switch module to cause the switch module to create a new VLAN thereon comprising the new device.

17. The network component of claim 16, wherein the VLAN configurator module further provides router settings of the matching configuration template to a router module to cause the router module to configure a firewall rule to permit traffic with the new device that has traffic attributes that match the matching traffic template and deny all other traffic.

18. The network component of claim 16, further comprising:
   an Internet of Things (IoT) proxy module; and
   wherein the VLAN configurator module provides router settings to cause a router module to route all traffic destined to the new device to the IoT proxy module; and
   wherein the IoT proxy module allows network traffic only with previously whitelisted destinations.

19. The network component of claim 18, wherein the IoT proxy module whitelists destinations associated with traffic attributes corresponding to the device type.

20. The network component of claim 18, wherein the IoT proxy module receives hypertext transfer protocol (HTTP) data as a portion of the network traffic to or from the new device, and encrypts the HTTP data into hypertext transfer protocol secure (HTTPS) data.

* * * * *